United States Patent
Torrisi et al.

(10) Patent No.: US 9,292,995 B2
(45) Date of Patent: Mar. 22, 2016

(54) AUTOMATIC DISTRIBUTOR FOR JUICES EXTRACTED FROM FRESH FRUIT

(75) Inventors: Salvatore Torrisi, Catania (IT); Mario Venticinque, Catania (IT)

(73) Assignee: A.A.T. AGROINDUSTRY ADVANCED TECHNOLOGIES S.P.A., Catania (IT)

( * ) Notice: Subject to any disclaimer, the term of this patent is extended or adjusted under 35 U.S.C. 154(b) by 407 days.

(21) Appl. No.: 13/810,055

(22) PCT Filed: Jul. 9, 2011

(86) PCT No.: PCT/EP2011/061710
§ 371 (c)(1),
(2), (4) Date: Mar. 13, 2013

(87) PCT Pub. No.: WO2012/007406
PCT Pub. Date: Jan. 19, 2012

(65) Prior Publication Data
US 2013/0160658 A1 Jun. 27, 2013

(30) Foreign Application Priority Data

Jul. 14, 2010 (IT) .............................. TO2010A0609

(51) Int. Cl.
| | |
|---|---|
| *B02C 15/00* | (2006.01) |
| *G07F 13/06* | (2006.01) |
| *A23N 1/00* | (2006.01) |
| *A23N 1/02* | (2006.01) |

(52) U.S. Cl.
CPC ................ *G07F 13/065* (2013.01); *A23N 1/00* (2013.01); *A23N 1/02* (2013.01)

(58) Field of Classification Search
CPC .................................. A23N 1/00; A23N 1/02
USPC ........... 99/502, 504, 495, 496, 456, 509, 510, 99/501, 503, 505, 512, 511
See application file for complete search history.

(56) References Cited

U.S. PATENT DOCUMENTS 3,705,546 A * 12/1972 Gunkel ......................... 100/118
4,594,838 A * 6/1986 Ficken et al. .................... 53/471
(Continued)

FOREIGN PATENT DOCUMENTS

| EP | 0 178 246 A2 | 4/1986 |
|---|---|---|
| EP | 0 343 488 A2 | 11/1989 |
| WO | 2007/091265 A2 | 8/2007 |

OTHER PUBLICATIONS

International Search Report for PCT/EP2011/061710 dated Jun. 26, 2012.
Italian Search Report for TO2010A000609 dated Mar. 28, 2011.
Italian Written Opinion for TO2010A000609 dated Jul. 14, 2010.
(Continued)

*Primary Examiner* — Phuong Nguyen
(74) *Attorney, Agent, or Firm* — Sughrue Mion, PLLC

(57) ABSTRACT

A refrigerated automatic distributor (51) for juices extracted from fresh fruits (53) comprising a fruit or vegetable stocking store (52), a juice extraction device (54) for extracting juice from fruits or vegetables, a fruit moving mechanism for moving the fruits or vegetables between the stocking store and the extraction device, a mouth (26) of access to a container (33) for the juice and an electronic control unit (31). The distributor (51) further comprises a sealing device (41) for sealing the container (33) with the juice extracted and to be dispensed and in which the electronic control unit (31) is provided for activating the sealing device (41) on request of the user.

14 Claims, 9 Drawing Sheets

(56) References Cited

U.S. PATENT DOCUMENTS

| | | | |
|---|---|---|---|
| 4,974,505 A * | 12/1990 | Torrisi | 99/502 |
| 6,202,547 B1 | 3/2001 | Tseng et al. | |
| 2011/0174161 A1* | 7/2011 | Brandle et al. | 99/292 |

OTHER PUBLICATIONS

Communication dated Feb. 13, 2014, issued by the European Patent Office in counterpart European application No. 11 737 918.0.

* cited by examiner

AUTOMATIC DISTRIBUTOR FOR JUICES EXTRACTED FROM FRESH FRUIT

FIELD OF THE INVENTION

The present invention relates to an automatic distributor for juices extracted from fresh fruit.

Specifically, the invention relates to an automatic distributor refrigerated for juices extracted from fresh fruit, comprising a fruit or vegetable stocking store for fruit or vegetable, a juice extraction device for extracting juices from fruit or vegetable, a moving mechanism for moving the fruit or vegetable between the stocking store and the extraction device, an access mouth of access to a container for the juice and an electronic control unit, according to the introductory portion of the main claims.

BACKGROUND OF THE INVENTION

Automatic distributors (Vending Machines) are known in the market, which distribute juices of citrus fruit, for instance oranges, obtained through squeezing machines from fruits cut in two portions, for an optimal extraction of the juices. Distributors of this type are used in commercial centers and, in general, in large locations of sale and transit, where vending machines for drinks and packaged foods are already present. An innovative aspect of the juice obtained from squeezing machines consists in the tasting and nutritional qualities. In fact juices from fresh fruit are much better with respect to the ones of the industry, generally subjected to extraction and preservative processes hardly stressful towards molecules and anthocyanins.

With different technology, the fruit juices can be also extracted by centrifugation from fine cut fruits and vegetables. It is obtained by simple centrifuges in domestic field with manual feeding cutting of the fruits and manual washing of the centrifuge after disassembly of the components. In the past, an automatic distributor for juices from fruits and vegetables has been also proposed, providing fine cutting of the fruits or vegetables and centrifugation with automatic actuation.

The market has currently determined the success of mixed juices got from different fruits or vegetable, with an integrated complex of vitamins as for A.C.E. juice or similar. The request for these juices is currently satisfied either by bar counter preparations, trough centrifugation of fruits or vegetables with high content of fibers, or through bottle distribution of industrially produced juices. The juices are also distributed by refrigerated distributors loaded with packaged products supplied by the alimentary industries, which are mixed on serving the drink. There result evident the limits and the drawbacks of such distribution, connected with the use of variously processed and preserved juices, and presenting reduced organoleptic and healty properties.

On the other hand, the use of sealed containers for distributing juices or drinks is very appreciated to users, because it ensures liberty of transport for the drinks, under best hygienical conditions and without danger of overflow and contaminations.

SUMMARY OF THE INVENTION

An object of the invention is to carry out an automatic distributor for juices, got from fruit fresh at the moment of the request, which is provided for supplying juices such to maintain unchanged the healty and nutritional qualities in containers to be sealed immediately after the supply of the juice.

According to this object, the refrigerated automatic distributor comprises a fruit or vegetable stocking store, a juice extraction device for extracting juice from fruits or vegetables, a moving mechanism for moving the fruits or vegetables between the stocking store and the extraction device, an access mouth to a juice container and an electronic control unit. In detail, the distributor comprises a sealing device for sealing the container with the spilled juice to be dispensed and in which the electronic control unit is provided for activating the sealing device on request of the user.

Thus, the produced drink can be consumed not only close to the place of installation of the distributor but also in other places, as workplace, household, sport centers, en route and during sporting activities and by people different from the distributor activator.

Another object of the invention is to carry out an automatic distributor for juices, obtained from fruit fresh at the moment of the request, which is provided for supplying a mix of juices from fruit and/or vegetable and preserving their healty and nutritional qualities.

According to this other object, the automatic distributor is provided for distributing single taste or mixed taste juices from fresh fruit and comprises: a fruit stocking store for fruits in particular citrus fruits to be squeezed; a squeezing device for extracting juices from the fruits to be squeezed; a stocking store or more stocking stores for fruits or vegetables to be centrifuged; a dissecting and centrifuging device or more dissecting and centrifuging devices for the fruits or vegetables to be centrifuged; and a transferring mechanism or more transferring mechanisms for the fruits or vegetables to be centrifuged. An electronic control unit is provided for activating, on request, the transferring mechanism or mechanisms, the squeezing device and/or the dissecting and centrifuging device or devices for selecting the fruits or vegetables from the stocking stores and transferring them to the squeezing device or the dissecting and centrifuging device or devices with squeezing and/or, respectively, dissecting and centrifuging for a single taste or mixed tastes distribution of the squeezed juice and/or the centrifuged juice or juices.

Conveniently, the stocking store, the extraction devices, and the sealing device are mounted on slide members having possibility of shifting between an internal operative position, and an external service position for maintenance operations.

The distributor can also comprise interchangeable modules for the used devices; these modules are easily detachable and remountable for service and are replaceable with identical modules or with modules of different characteristics. Thus, an operator responsible of the service can configurate the machine in function of features and needs of seasonal fruit or other user wants. The modules can comprise common standard connectors, while the electronic control unit can suitably recognize and drive the used module. The stocking store is easily interchangeable through suitable guides.

Suitably, the module for the squeezing device is pre-set for cutting and squeezing citrus fruits, expelling the discards and automatically washing. The modules for the dissecting and centrifuging devices include the respective transferring mechanism and a dissecting mechanism and a centrifuge with removal of the discards and automatic washing. The juice or the juices are spilled close to a module which, on request of the user, is activated for sealing the container. The machine could comprise electronic cards provided for controlling the flow of the various operations and a graphic display for directly interacting with the user.

Conveniently, in the various configurations of the distributor, the stocking stores, the extraction devices, and the sealing device are mounted on slide members having possibility of shifting with respect to the vane 27 of the cabinet 22 between an internal operative position, and an external position, of service in operations of maintenance.

According to the present invention the automatic distributor can comprise a citrus squeezing module and two centrifuging modules for different typologies of fruits and vegetables.

BRIEF DESCRIPTION OF THE DRAWINGS

The characteristics of the invention will become clear from the following description given purely by way of non-limiting example, with reference to the appended drawings in which.

DETAILED DESCRIPTION OF THE PREFERRED EMBODIMENTS

Figure 1:
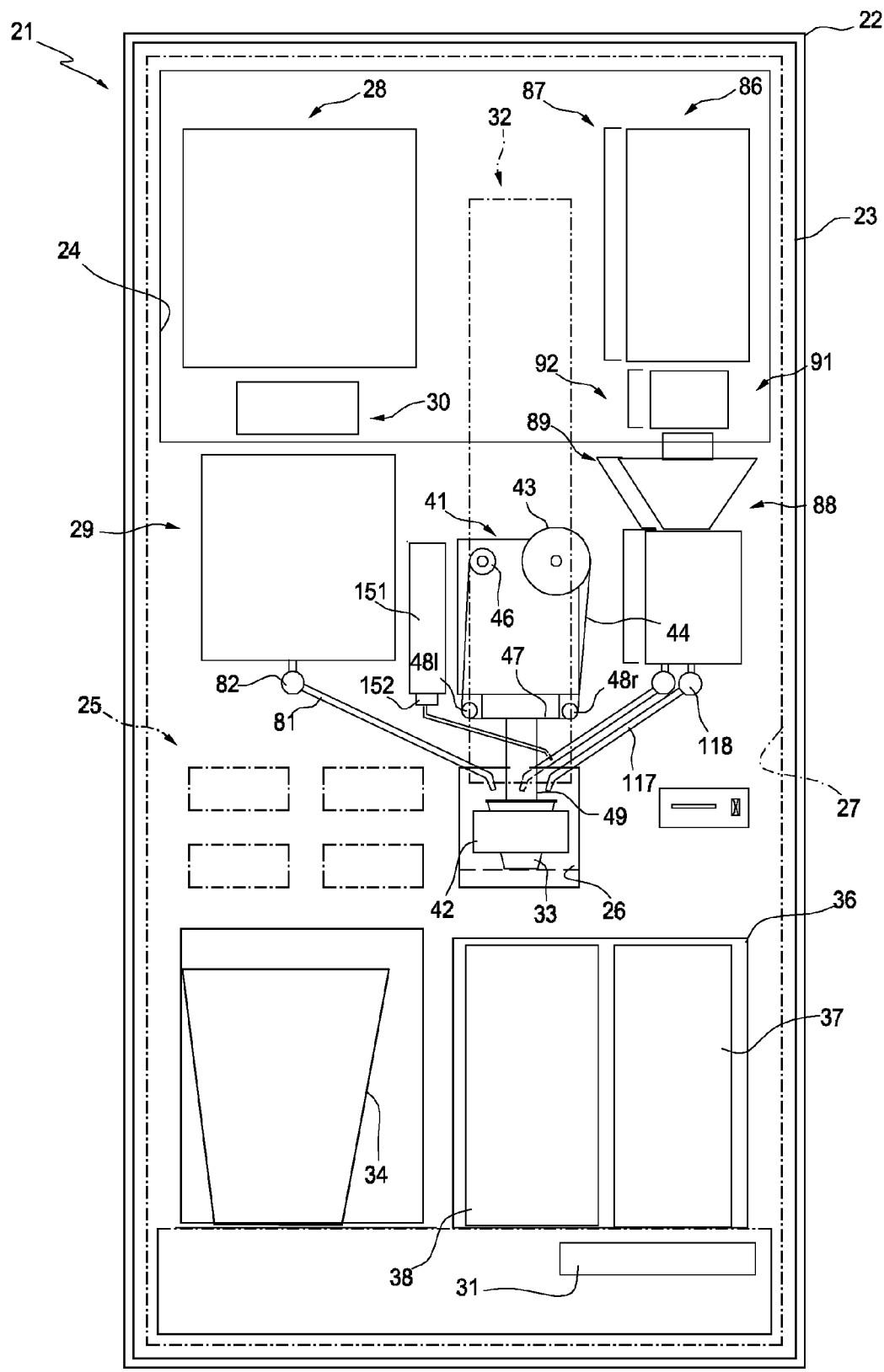
FIG. 1 represents a frontal schematic view of an automatic distributor for juices extracted from fresh fruit according to the invention.

An automatic distributor or vending machine for delivering fruit juices, according to the invention, is represented with 21 in FIG. 1. The distributor 21 comprises a cabinet 22 having a front door 23 with a glass window 24, a control panel 25, and an access mouth 26, and in which the control panel 25 has also a function of interface for payment by an user. The juices are received on juices container or glasses 33 on a seat 42 for the container 23 arranged behind the access mouth 26.

A vane 27 of the cabinet 22 lodges a stocking store 28, a juice extraction device 29, a fruit moving mechanism 30 and an electronic control unit 31. The stocking store 28 lodges fruits or vegetables to be processed by the juice extraction device 29; the moving mechanism 30 moves the fruits or vegetables between the stocking store 28 and the extraction device 29, while the electronic control unit 31 controls the stocking store 28, the juice extraction device 29, and the moving mechanism 30. A container feeder 32 for dispensing the juice containers or glasses 33 for the juice to be distributed is mounted on an internal wall of the door 23. After feeding of a container 33 into the seat 42, the juice extracted by the device 29 flows into the container 33, to availability for the user.

With function of service, the automatic distributor 21 comprises a waste container 34, a cooling group 36, a hydraulic system, not shown and tanks 37 and 38. The waste container 34 is provided for receiving the discards from the extraction device 29; the cooling group 36 refrigerates the inside of the cabinet 22 and, in particular, the stocking store 28, while the hydraulic system is provided for cleaning the extraction device 29 and use of liquid from and to tanks 37 and 38. Power supply groups and respective wirings, not represented in the figures, are also provided which interface the panel 25 with the electronic unit 31 and control the various electromechanic components of the distributor.

According to a characteristic of the invention, the distributor 21 comprises a sealing device 41 for sealing the container 33 with the spilled juice to be distributed, and in which the electronic control unit 31 is provided for activating the sealing device 41 on request of the user.

Figure 7:
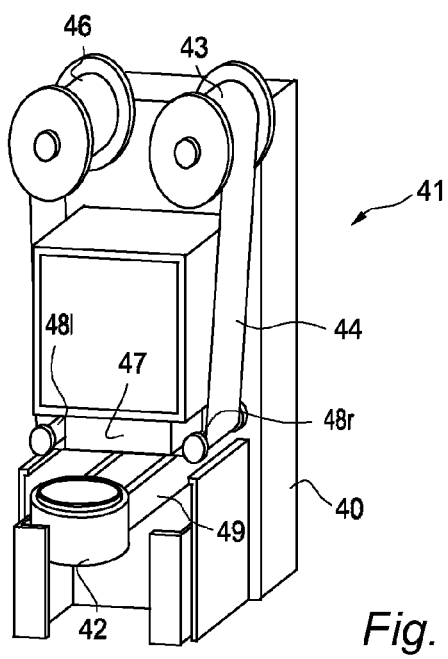
FIG. 7 shows a schematic perspective view of another device of the distributor for fruit juices of FIG. 2.

The sealing device 41 (see also FIG. 7) comprises a seal body 40, the seat 42 for the container 33 to be sealed, a feeding spool 43 for a sealing film 44, a taking up spool 46 for remaining portions of the sealing film and a sealing member 47. The feeding spool 43 and the taking up spool 46 are rotatable on an upper part of the body 40; the seat 42 projects from a lower portion of the body 40, while the sealing member 47 projects from an intermediate portion of the body 40. The seat 42 has possibility of movement horizontally and vertically between a location close to the access mouth 26 and a position close to the sealing member 47. The feeding spool 43 and the taking up spool 46 are suitably driven by motor means, not shown, lodged in the seal body 40.

The sealing film 44 extends downwardly from the feeding spool 43 to intermediate rollers 48l and 48r and proceeds upwardly to the taking up spool 46. Specifically, the sealing film 44 defines a plain section tensioned between the intermediate rollers 48l and 48r, adjacent to a lower part of the sealing member 47, while the taking up spool 46 rewinds remaining portions of the film 44 after the sealing. Suitable moving members 49 of the sealing device 41 are actuatable for shifting the seat 42 with the container 33 horizontally and vertically between the location close to the access mouth 26 and the location close to the sealing member 47 for sealing an edge or flange of the container with the plain section of the film 44, against the lower part of sealing member 47, and from the location close to the sealing member 47 to the location close to the access mouth 26 to the availability for the user.

In an alternative solution, not shown in the drawings, the sealing device, of known type, comprises a cover store, which stores covers for the juice containers or glasses 33, and moving and closing members for moving each cover between the cover store and the access mouth 26 for closing the container 33 with the spilled juice.

Figure 2:
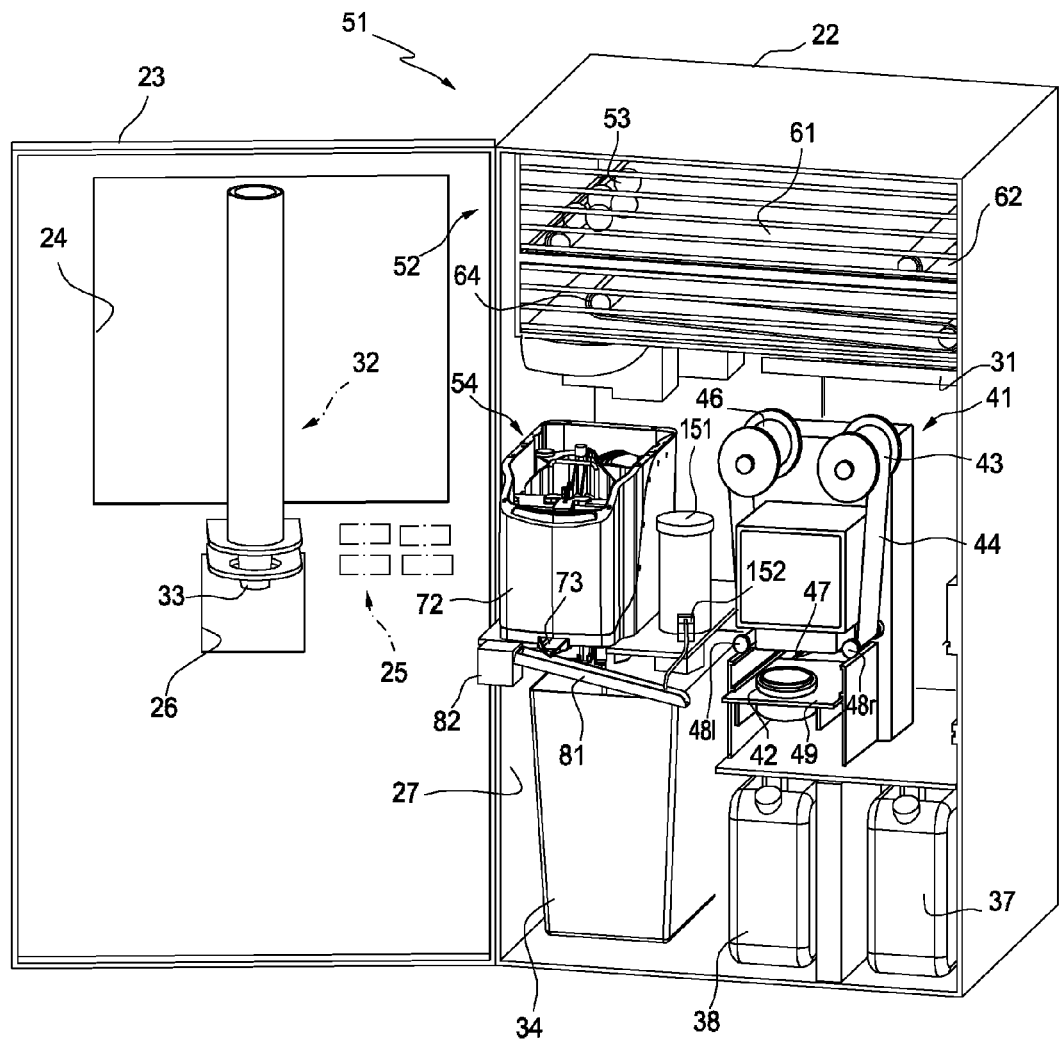
FIG. 2 shows a schematic view of an automatic distributor for fruit juices of the invention in a first embodiment of the invention.
Figure 5:
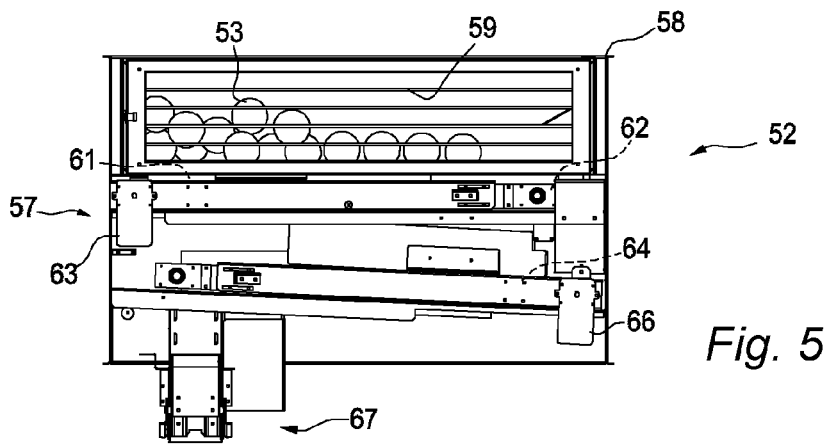
FIG. 5 is a schematic front view of a component of the distributor shown in FIG. 2.

In a first exemplary embodiment of FIG. 2, the automatic distributor of the invention, herein represented with 51, has a general structure similar to the one of the distributor 21 of FIG. 1 and equal components of identical numbering. The distributor 51 comprises a stocking store 52 for citrus fruit 53, typically oranges, and in which the extraction device comprises a citrus squeezing machine 54 for extracting the juice by squeezing of the fruits. The fruit moving mechanism, represented with 56, comprises a belt conveyor 57 (see FIG. 5) provided for singularly conveying the fruits toward the squeezing machine 54.

For what it concerns the present invention, the general structure of the distributor 51, except for the stocking store 52, the belt conveyor 57 and the sealing device 41, is similar to the one of the machine vending machine of the Applicant AAT Agroindustry Advanced Technologies S.p.A, sold as OR 100, while the citrus squeezing machine 54 is of the type described in the Patent Application WO08035388, also in the name of the Applicant AAT Agroindustry Advanced Technologies S.p.A.

Figure 6:
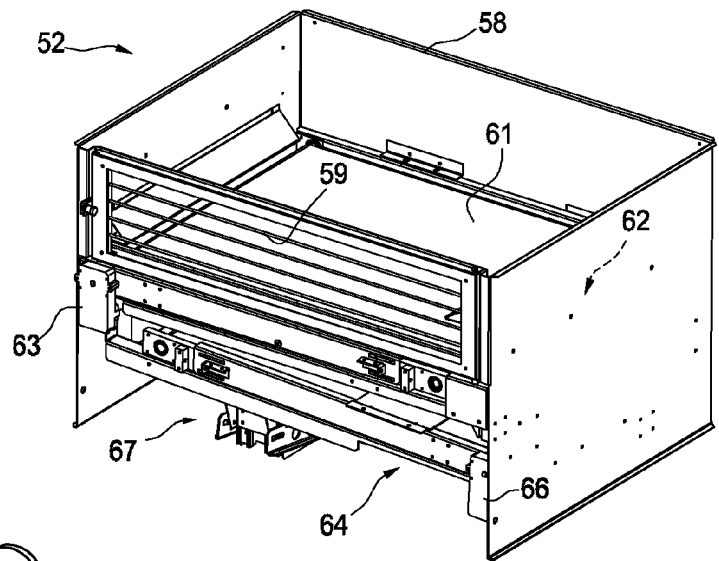
FIG. 6 represents a schematic perspective view of the component of FIG. 5.

In synthesis, the stocking store 52 (FIGS. 2, 5 and 6) comprises a parallelepiped container 58 for the citrus fruits 53, mounted on slide members of the vane 27. The container 58 is open on the top and is limited in the front by a grating 59, which allows seeing the content through the glass window 24 of the door 23. On a lower part, the container 58 is limited by a higher branch of a lengthened ring belt 61 of the conveyor 57, which extends up to a terminal opening 62.

The belt conveyor 57 comprises moreover a motor gear 63 for the belt 61 and a second lengthened ring belt 64 actuated by a motor gear 66. The ring belt 64 is arranged below the ring belt 61 and extends from the opening 62 up to a sequencing mechanism 67, above the squeezing machine 54. An inclined crossbar, not shown in the drawings, has function of diversion of the citrus fruits toward the sequencing mechanism 67.

In the use, the citrus fruits of the container 58 are transported by the belt 61 up to the opening 62, fall on the underlying belt 64 and, by advancing, are queued by the inclined crossbar up to the sequencing mechanism 67 and singly transferred to the squeezing machine 54.

Figure 3:
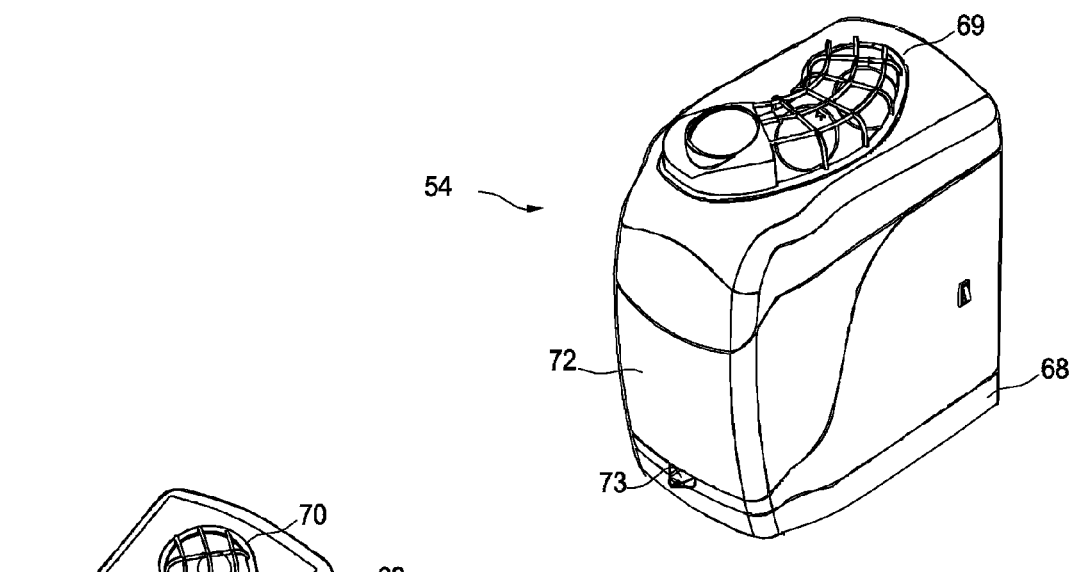
FIG. 3 is a schematic view of a device of the distributor represented in FIG. 1.
Figure 4:
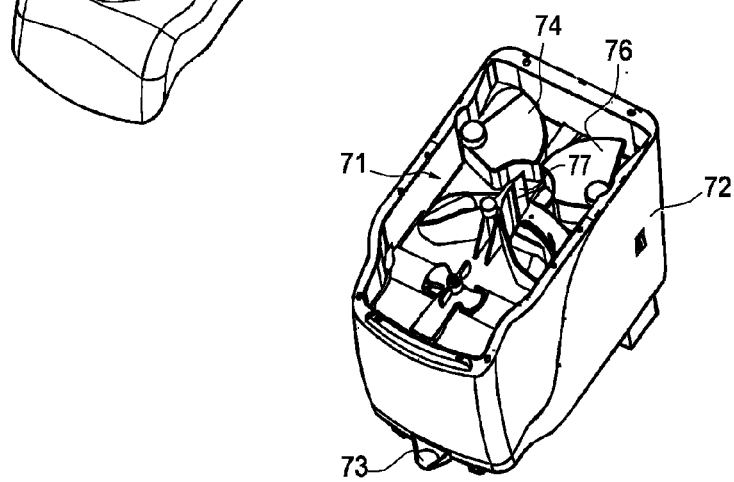
FIG. 4 shows a view exploded of the device of FIG. 3.
Figure 4:
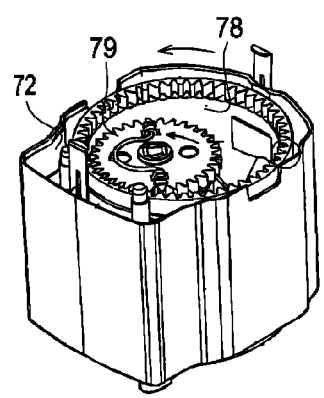

The squeezing machine 54 (FIGS. 3, 4 and 5) comprises a machine body 68 with a motor group, not shown, a shaped cover 69 with a slide 70 downstream of the sequencing mechanism 67, a sequencing and cutting group 71 and a squeezing room 72 with an output nozzle 73. The sequencing and cutting group 71 comprises two pushers 74 and 76 with mutual oscillatory movement and a blade 77, and defines an output of the squeezing room 72. The pushers 74 and 76 provide to queuing the citrus fruits of the slide 70; then, the single fruits are pushed against the blade 77 for being halfway cut and falling into the squeezing room 72 between an external drum 78 and an internal squeezing and filtering drum 79 in synchronous rotation. By means of the external drum 78 the two halves of the citrus fruit are squeezed against the squeezing and filtering drum 79 and their juice goes out through the nozzle 73, while the discards go out the output of the squeezing room 72.

A channel 81 is interposed between the output nozzle 73 and the access mouth 26 and is operatively connected with a channel moving group 82. The channel 81 has an outflow end and is inclinable by the moving group 82 between a lifted position of rest, and a depressed position of work. In the condition of rest, the outflow end of the channel 81 is out of the movement trajectory of the containers 33 by the feeder 32 for a free dispensing of the containers into the access mouth 26. In the condition of work, the outflow end is above the container 33 in the access mouth 26 for the spilling of the juice outgoing from the nozzle 73 toward the container 33.

According to the invention, the distributor 51 is actuatable, on control of the user, for receiving in the container 33 the juice of oranges selected from the stocking store 52 and squeezed by the machine 54. Further, if the requested selection provides it, the sealing device 41 is also actuated. The container 33 will be moved up to the sealing member 47 for sealing a flange or an edge of the container with the sealing and, after sealing, from the sealing member 47 to the access mouth 26, for availability to the user.

According to another characteristic of the invention, the automatic distributor 21 (FIG. 1) is provided for distributing juices of fresh fruit of single taste or mixed taste and further comprises: an additional stocking store 86 or more additional stocking stores 87 for fruits or vegetables to be centrifuged; a dissecting and centrifuging device 88 or more dissecting and centrifuging devices 88 and 89 for the fruits or vegetables to be centrifuged, and a selecting and transferring device 91 or more selecting and transferring devices 91 and 92. The electronic unit 31 is provided for activating, on request, the moving mechanism 30 and the selecting and transferring device 91 or devices 91 and 92, the squeezing machine 54 and/or the dissecting and centrifuging device 88 or devices 88 and 89 for selecting the fruits or vegetables from the stocking stores and transferring them to the squeezing machine 54 and/or to the dissecting and centrifuging device or devices, with squeezing of the selected fruits and/or, respectively, dissecting and centrifuging of the other fruits or vegetables for supplying a mixed taste of a squeezed juice and a centrifuged juices or a mixed taste of a squeezed juice and/or more centrifuged juices.

For the feeding of the dissecting and centrifuging device 88 or devices 89, the respective selecting and transferring device can comprise a spiral transport mechanism, not shown in the drawings, provided for singly receive the fruit and distribute it toward the dissecting and centrifuging device 88 or devices 88 and 89. For fruits or vegetables having particular shapes, a nipping mechanism, also not shown, can be provided for taking the fruits or vegetables from the stocking store and deposit them into the dissecting and centrifuging device or devices.

The dissecting and centrifuging device 88 and the dissecting and centrifuging devices 89 further comprise washing mechanisms for the respective components, for instance of the type used in the above mentioned vending machine OR 100 of the Applicant AAT S.p.A., herein neither shown nor described in detail.

Figure 8:
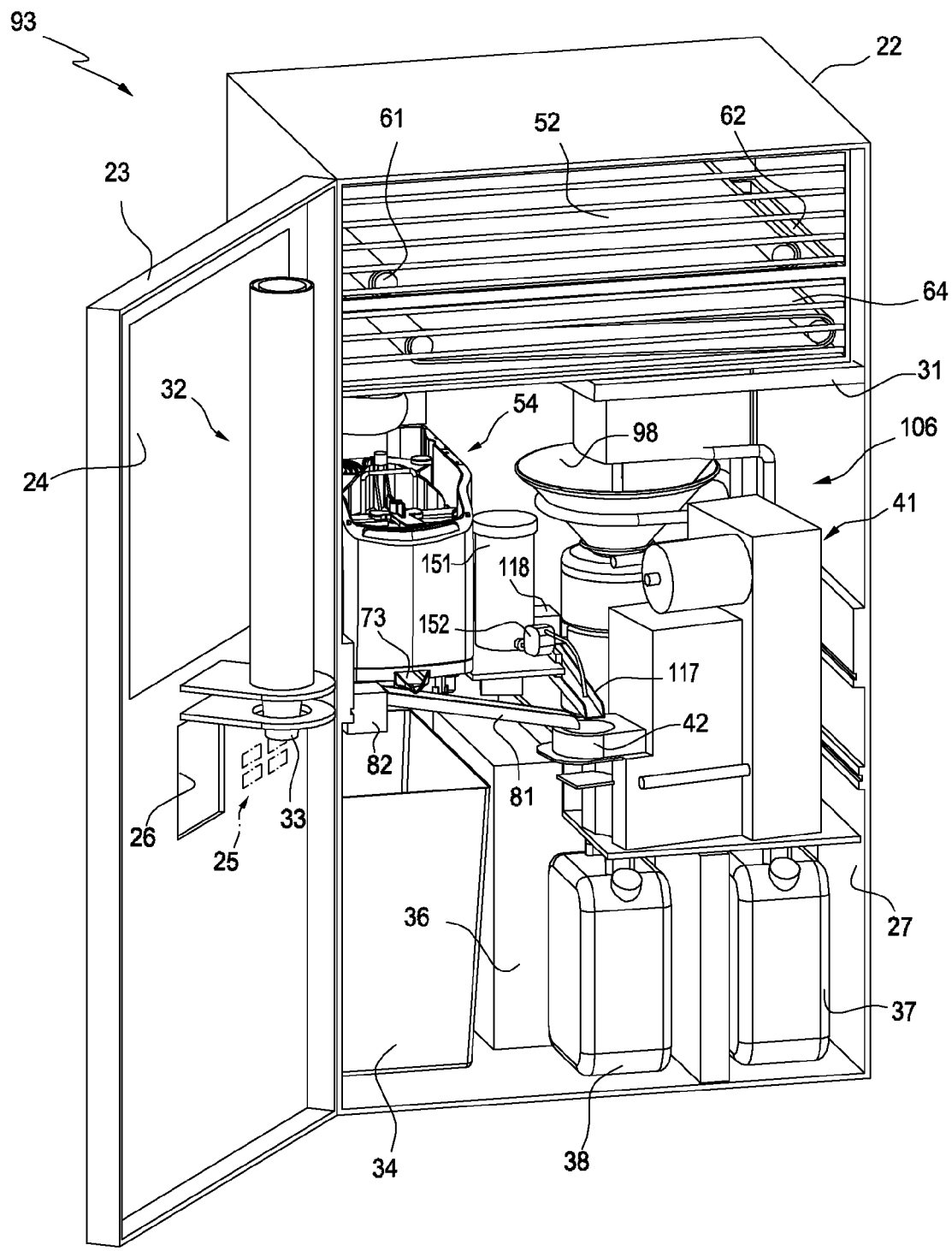
FIG. 8 represents a schematic view of an automatic distributor for fruit juices of the invention according to a second embodiment of the invention.
Figure 9:
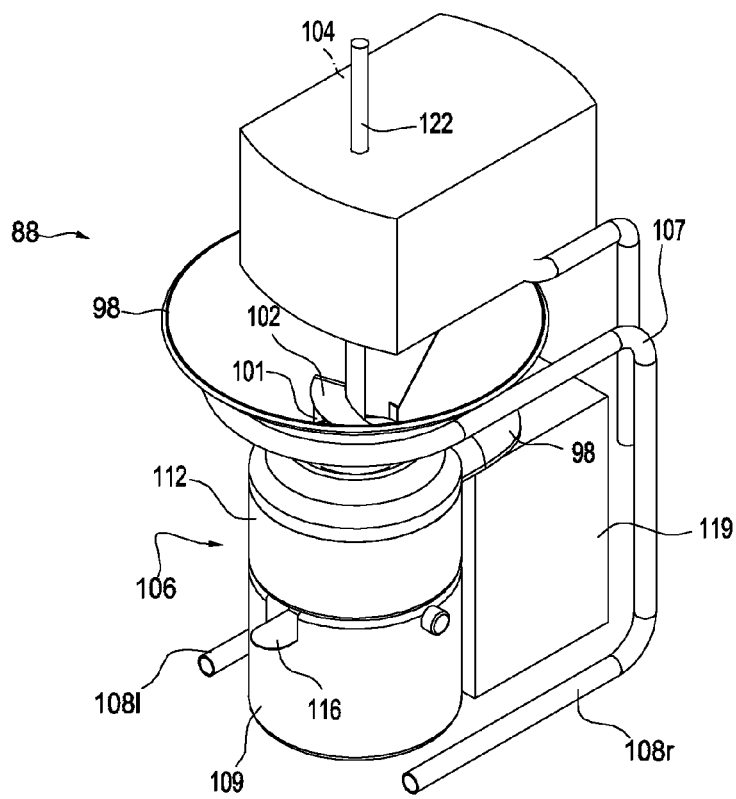
FIG. 9 is a schematic view of a further device of the distributor of FIG. 8.
Figure 10:
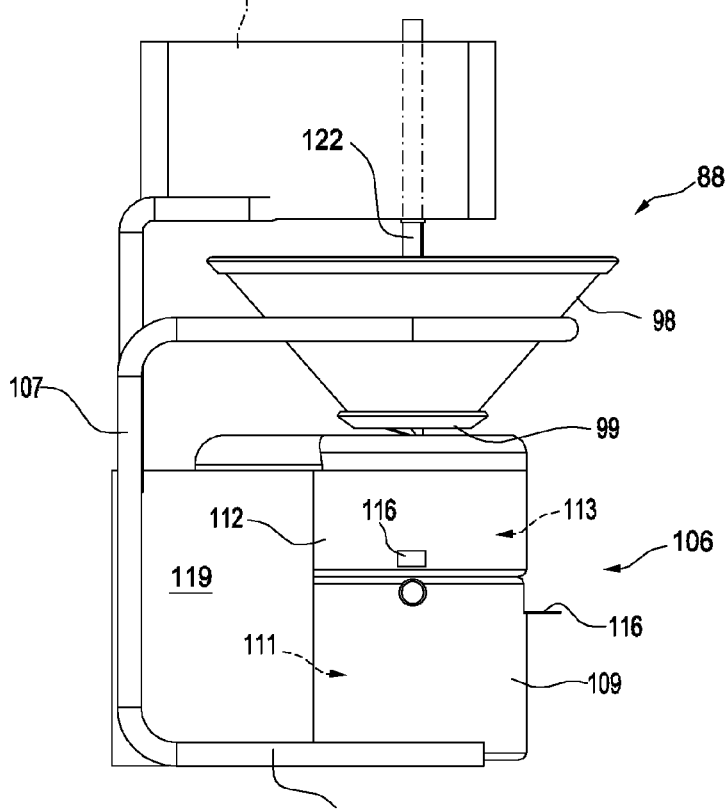
FIG. 10 shows a schematic lateral view of the device of FIG. 9.
Figure 11:
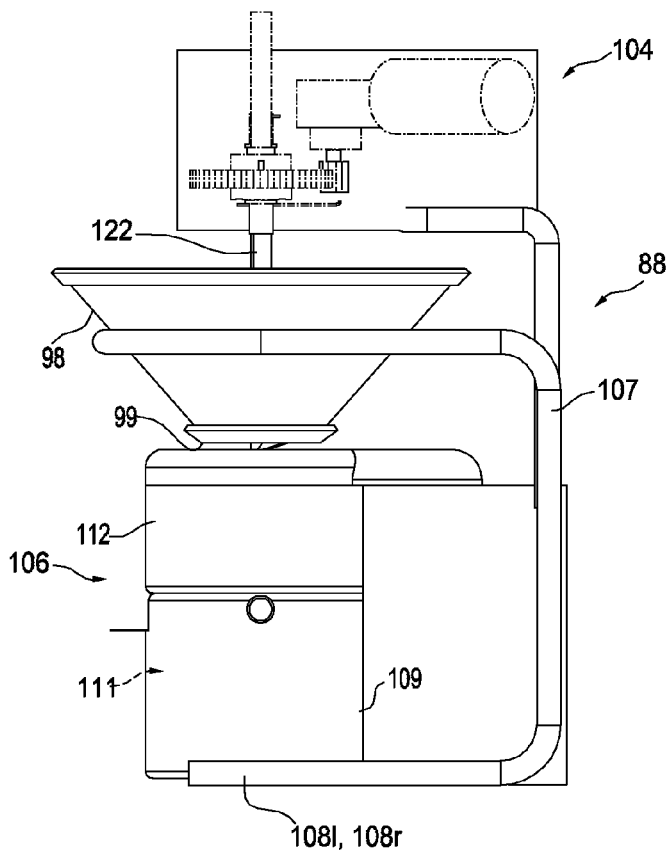
FIG. 11 is another schematic lateral view and section of the device of FIG. 9.
Figure 12:
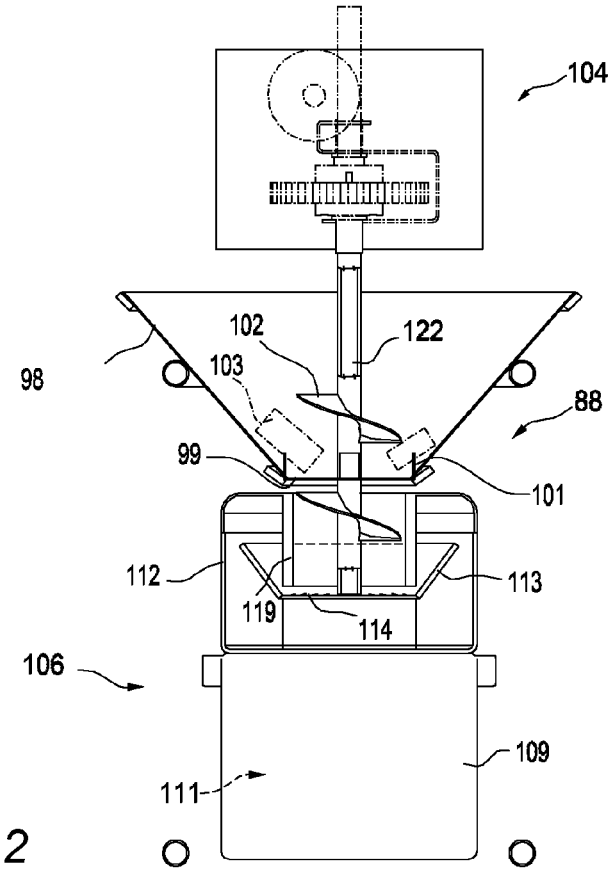
FIG. 12 is a schematic front view and section of the device of FIG. 9.

In a second embodiment of the invention, the automatic distributor, represented with 93 in FIG. 8, provides simplified solutions for the stocking store and the selecting and transferring device of the fruits or the vegetables to be sectioned and centrifuged.

Specifically, as additional stocking store, the distributor 93 comprises a large hopper 98 substantially of funnel shape, in which the fruits or the vegetables to be sectioned and centrifuged are lodged. The hopper 98 defines, in a lower part, an output mouth 99 with fixed knives 101, while a cochlea 102 is provided as selecting and transferring device. The cochlea 102 has a vertical axis actuated by a gearmotor group 104 for feeding the fruits or vegetables 103 of the hopper through the mouth 99, while the knives 101 provide to dissecting the fruits outgoing through the mouth 99.

The dissecting and centrifuging device of the distributor 93 comprises a centrifuge 106 with vertical axis, which is arranged downstream of the mouth 99. A tubular frame 107 has a function of support for the hopper 98 and the gearmotor group 104 and is shaped so as to define, in a front portion, two base arms 108*l* and 108*r* between which the centrifuge 106 is lodged, underneath the output mouth 99. The centrifuge 106, of known type, comprises a centrifuge body with a lower section 109 of housing for a centrifuge motor 111 and an upper section 112 of housing for a centrifuge drum 113 having, on the bottom, corresponding fine shuttering knives 114.

The upper section 112 of the centrifuge 106 has a function of reception for the extracted juice outgoing from a nozzle 116, while a channel 117 makes flowing out, in the use, the juice outgoing from the nozzle 116 toward the container 33 distributed into the access mouth 26. In detail, also the channel 117 is inclinable by a channel moving group 118 between a lifted position of rest, and a depressed position of work. In the position of rest, the outflow end of the channel 117 is out of the movement trajectory of the containers 33; in the position of work, the outflow end is above a container 33 lodged in the access mouth 26 for the spilling of the outgoing juice from the nozzle 116 toward the same container 33.

From opposite to the nozzle 116, the centrifuge 106 comprises a container 119, in connection with the upper section 112, which receives, by centrifugal force, waste or discards of centrifuging, in a way known in sé.

The cochlea 102 crosses the output mouth 99 and extends in a tubular section 121 internally to the centrifuge drum 111 up to the shuttering knives 114. The cochlea 102 is fixed on an axis 122, which is driven in the rotation by the gearmotor group 104 and, on request by the service operator, is axially shiftable upward so as to spacing apart the cochlea from the tubular section 121. It allows the shifting of the centrifuge 106 and of the container 119 with respect to the hopper 98 and their removal between the base arms 108l and 108r functionally to emptying of the container and maintenance.

For the hopper 98 and the centrifuge 106, the washing devices for the respective components can comprise the use of a hollow axis, functionally equivalent to the axis 122, for the cochlea 102. The hollow axis is connected with the hydraulic system and is provided of suitable spaced nozzles for a pressure flowing of a washing liquid toward the components to be washed.

The automatic distributor 21, 51, 93 (FIGS. 1, 2, 8) can also comprise in the vane 27 a juice distributor 151 for juice or aromatizing liquid and/or additive. The distributor 151 is actuatable for adding the additives to the juice or the juices extracted from fresh fruits or vegetables. The additives can be constituted, for instance, by lemon juice or sweetener. The juice distributor 151 includes, in detail, a dosing device 152 and a flexible outflow pipe. The dosing device 151 is actuatable, on control of the electronic unit 31, for pre-defined quantities of the additive, while the outflow pipe makes flowing out the additive toward the channels 81 or 117.

Figure 13:
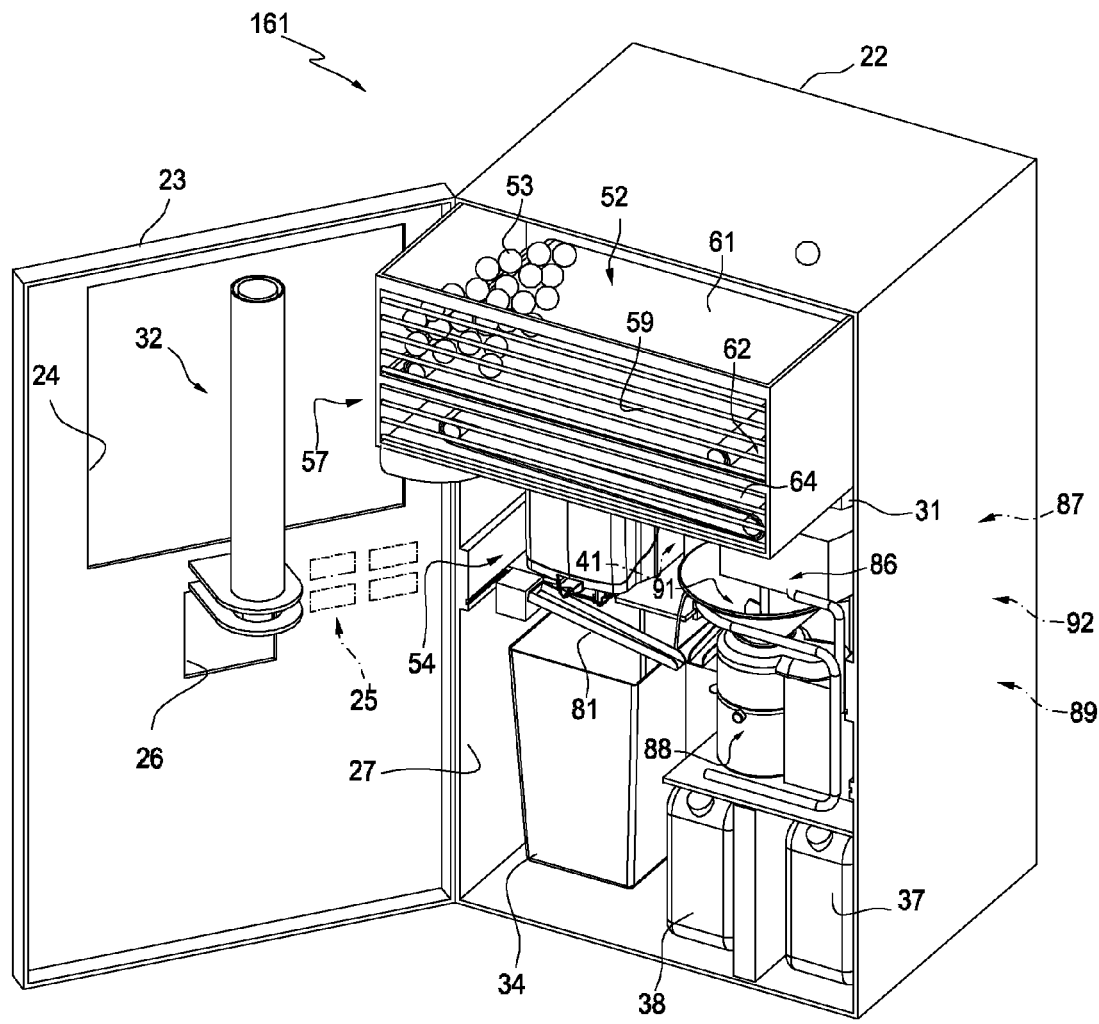
FIG. 13 represents a schematic view of an automatic distributor for fruit juices of the invention according to a third embodiment of the invention.

In a third embodiment of FIG. 13, the automatic distributor of the invention, herein represented with 161 has a general structure similar to the one of the distributors 21, 51, 93 (FIGS. 1, 2, 8) and components equal having identical numbering. The distributor 161 can be set up according to four operative configurations and comprises: fruit stocking stores 162, the squeezing machine 54, two dissecting and centrifuging devices 88 and 89, the sealing device 41, the waste container 34 and the hydraulic system for cleaning the various devices with the tanks 37 and 38.

Conveniently, in the various configurations of the distributor of the invention, the stocking stores, the extraction devices, and the sealing device are mounted on slide members having possibilities of shifting with respect to the vane 27 of the cabinet 22 between an internal operative position and an external position of service, in a function of maintenance.

According to another characteristic, the squeezing machine 54 the dissecting and centrifuging device 88 or devices 88, 89 and the sealing device 41 are constituted by respective modules easily interchangeable, for configuring the vending machine as desired by the operator, for instance in function of fruits or vegetables of season.

Specifically, each module of the distributor has a standard common connector for an interface group of the electronic control unit 31, while each module is recognizable by the electronic control unit for an automatic configuration of the distributor according to the used modules. For instance, the unity 31 can comprises electronic cards provided for controlling the flow of the various operations and a graphic display of the control panel 25, for directly interacting with the user.

Figure 14:
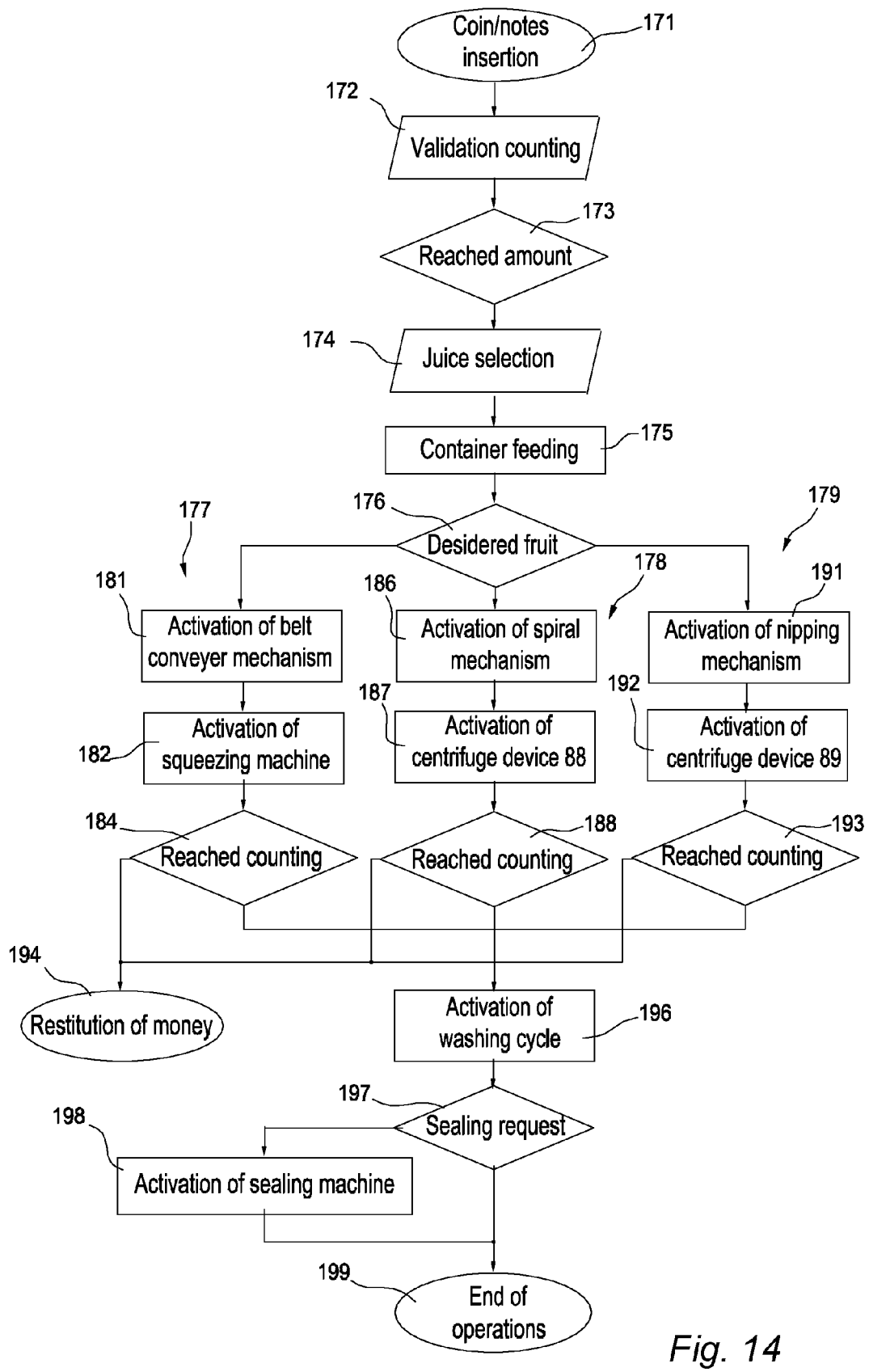
FIG. 14 shows an operative block diagram of the automatic distributor for fruit juices according to the invention.

The operation of the automatic distributor 21, 161 is now referred to the diagram of FIG. 14, in the hypothesis of a configuration of three modules including the squeezing machine 54 for citrus fruits with a belt transport mechanism, the dissecting and centrifuging device 88 for fruits of regular shape and a spiral transport mechanism and the dissecting and centrifuging device 89 for fruits of irregular shape and the respective nipping mechanism. Briefly, this scheme can be also applied to the automatic distributor 93 of FIG. 8, in which the transferring of the fruits to be centrifuged includes a cochlea mechanism controlled by a gearmotor.

The basic program for the operation of the automatic distributor 21, 161 provides a step 171 in which the correct insertion of coins or banknotes of the control panel 25 is checked, and the respective validation is controlled in a step 172. On the basis of a selected menu, the reached amount is checked in a decision box 173, with indication to the user of the starting of selection in a block 174. The program proceeds by activating the feeder 32 for dispensing a container 33 into the access mouth 26, step 175, and to a step 176 of selection for the whished fruit, with three branches 177, 178 and 179.

The branch 177 provides activation of the belt conveyor 57, step 181, for singularly conveying the citrus fruit toward the squeezing machine 54 and a step 182 of activation of the machine 54, with spilling of the juice, and a decision box 184 of counting regarding the spilled quantity of juice. In the branch 178, the program actuates the spiral transport mechanism, step 186, for singularly transporting the regular fruit toward the dissecting and centrifuging device 88, and the device 88 with spilling of the juice, step 187 and proceeds to a decision box 188 of counting of the spilled quantity. The branch 179 provides activation of the nipping transport mechanism, step 191 for taking the irregular fruit and introducing it into the dissecting and centrifuging device 89. The program proceeds with a step 192 of activation of the dissecting and centrifuging device 89 with spilling of the juice, and a decision box 193 of counting regarding the spilled quantity.

After the counting checks of the decision boxes 184, 188 and 193, in the case of insufficient spilling, the program continues with a step 194 of return of coins and banknotes. With settlement of the correct quantity of the required juice, the program advances with the starting of a washing cycle, step 196.

Finally, the program checks in a decision box 197 if the user has selected in the menu the sealing of the container: in positive, the program proceeds with the sealing, step 198, and to the condition of end of the operations, step 199. The program accesses directly to the step 199 from the decision box 197 in the case in which the user has not selected the menu with the sealing of the container.

Naturally, the principle of the invention remaining the same, the embodiments and the details of construction of the automatic distributor for juices extracted from fresh fruit can broadly be varied with respect to what has been described and illustrated, by way of non-limitative example, without by this departing from the ambit of the present invention.

We claim:

1. A refrigerated automatic distributor for juices extracted from fresh fruits comprising a fruit or vegetable stocking store, a juice extraction device for extracting juice from fruits or vegetables and a fruit moving mechanism for moving fruits or vegetables between the stocking store and the extraction device, said distributor being provided comprising an access mouth for access to the juice container, an electronic control unit, and a sealing device for sealing the juice container with the juice spilled and to be dispensed; wherein the sealing device is of the type using a sealing film and includes a container seat for the juice container accessible through the access mouth, a sealing member for sealing a flange or edge of the container with the sealing film and seat moving means for shifting the container seat between a location close to the access mouth and a location close to the sealing member;

the sealing member defines a lower section while said sealing film defines a plain section adjacent to said lower section of the sealing member; wherein the electronic control unit is provided for activating the seat moving means and the sealing member on request of the user, for shifting the container seat with the juice container from the location close to the access mouth to the location close to the sealing member in order to seal the flange, or the edge of the juice container with the sealing film and, after sealing, for shifting the container seat with the juice container to the location close to the access mouth for availability to the user; and wherein the fruit moving mechanism includes a conveyor.

2. The distributor for juices extracted from fresh fruits according to claim 1 wherein the stocking store stores citrus fruits and wherein the juice extraction device includes a squeezing machine for extracting the juice as citrus squash from said citrus fruits.

3. The distributor for juices of fruit according to claim 2 including a cabinet having a door provided with a glass window, wherein the stocking store comprises a fruit container with front visible through said glass window, and wherein the fruit moving mechanism comprises, one above the other, an upper conveyor belt and a lower conveyor belt, said fruit container is limited, in a lower part thereof, by an upper branch of the upper conveyor belt and a terminal opening for the fall of the citrus fruits toward an upper branch of the lower conveyor belt, while the squeezable fruits are deviated by an inclined crossbar above the lower transport belt and are serialized by a sequencing mechanism toward said squeezing machine.

4. The distributor for juices of fruit according to claim 2 wherein the fruit or vegetable stocking store comprises a fruit container, while the fruit moving mechanism comprises, overlapping, an upper conveyor belt and a lower conveyor belt, and in which said fruit container is limited, in a lower part thereof, by an upper branch of the upper conveyor belt and a terminal opening for the fall of the citrus fruits toward an upper branch of the lower conveyor belt, while the citrus fruits are deviated by an inclined crossbar above the lower transport belt and are serialized by a sequencing mechanism toward the squeezing machine.

5. The distributor for juices extracted from fresh fruits according to claim 1 wherein the sealing device further includes a feeding spool for the sealing film, and a taking up spool for portions of the film remaining after the sealing.

6. The distributor for juices extracted from fresh fruits according to claim 5 wherein the sealing device further comprises a seal body and motor means for driving the feeding spool and the taking up spool lodged in said seal body, wherein the seal body has an upper portion, intermediate portion and a lower portion, said upper portion supports the feeding spool and the taking up spool while the sealing member and the container seat project, respectively, from said intermediate portion and said lower portion of the seal body.

7. The distributor for juices extracted from fresh fruits according to claim 5, wherein said refrigerated automatic distributor further comprises a container feeder for dispensing the juice containers into the container seat on the location close to the access mouth.

8. The distributor for juices extracted from fresh fruits according to claim 5 wherein the sealing device further comprises a seal body with an upper portion, an intermediate portion and a lower portion, and intermediate rollers, wherein said upper portion supports the feeding spool and the taking up spool the container seat projects from said lower portion, while the sealing member projects from said intermediate portion, said intermediate rollers are adjacent to the lower section of the sealing members, wherein the sealing film extends downwardly from the feeding spool to the intermediate rollers and proceeds upwardly to the taking up spool and wherein the plain section is tensioned between said intermediate rollers.

9. The distributor for juices extracted from fresh fruits according to claim 8 wherein the seat moving means is actuatable for shifting the container seat with the juice container horizontally and vertically between the location close to the access mouth and the position close to the sealing member.

10. The distributor for juices extracted from fresh fruits according to claim 1 wherein it comprises a cabinet with a room for the fruit stocking store, the extraction device and the sealing device and wherein the stocking store, and/or the extraction device, and/or the sealing device have possibility of shifting with respect to said room between an operative position and a position of service in function of maintenance.

11. The distributor for juices extracted from fresh fruits according to claim 1, comprising more fruit or vegetable stocking stores, more juice extraction devices and more fruit moving mechanisms and wherein the electronic control unit activates selectively, on request of the user, the fruit moving mechanism and the juice extraction device for extracting a juice of a given typology, or more fruit moving mechanisms and more juice extraction devices for extracting juices of different typologies, and spilling in the juice container a juice of fresh fruit of a single taste or juices of fresh fruit of a mixed taste.

12. The distributor for juices extracted from fresh fruits according to claim 11 wherein one of the said juices is obtained by centrifugation and wherein one of said extraction devices comprises a mechanism of dissection and centrifuging for the fruits or vegetable to be centrifuged, and wherein the electronic control unit activates, on control, one of the fruit moving mechanisms for moving fruits or vegetables from the stocking stores and transferring them to the mechanism of dissection and centrifuging with centrifuging of the fruit or vegetable for a single or mixed taste spilling of the squeezed juice and/or the centrifuged juice, and wherein a juice feeder for aromatizing additive is optionally provided, said juice feeder being actuatable for the addition of an aromatizing additive to the extracted juice or juices.

13. The distributor for juices extracted from fresh fruits according to claim 11, wherein said refrigerated automatic distributor further comprises a container feeder for dispensing the juice containers into the location close to the access mouth, respective channels arranged between the juice extraction devices and the access mouth, and channel moving groups actuatable for moving said channels between a rest position and a work position, and wherein the rest position is such to allow the dispensing of the juice containers from the container feeder to the container seat on the location close to the access mouth, while the work position ensures the spilling of the juice or juices to the juice container through said channels.

14. The distributor for juices extracted from fresh fruits according to claim 1, wherein the stocking store, the juice extraction device, the fruit moving mechanism and the sealing device define respective modules, wherein said modules are easily interchangeable, the electronic unit includes an interface group and wherein each of said modules has a connector for said interface group and is recognizable by the electronic unity for an automatic configuration of said refrigerated automatic distributor according to the used modules.

* * * * *